US007343358B2

(12) United States Patent
Rozendaal et al.

(10) Patent No.: US 7,343,358 B2
(45) Date of Patent: Mar. 11, 2008

(54) MAILER-POSTAL SERVICE INTERFACES

(75) Inventors: Vincent Rozendaal, Essex (GB); Stephen Kelly, Hertfordshire (GB)

(73) Assignee: Pitney Bowes Ltd., The Pinnacles, Harlow Essex (GB)

( * ) Notice: Subject to any disclaimer, the term of this patent is extended or adjusted under 35 U.S.C. 154(b) by 321 days.

(21) Appl. No.: 10/311,740

(22) PCT Filed: Jun. 12, 2001

(86) PCT No.: PCT/EP01/06659

§ 371 (c)(1), (2), (4) Date: Oct. 20, 2003

(87) PCT Pub. No.: WO01/99056

PCT Pub. Date: Dec. 27, 2001

(65) Prior Publication Data

US 2004/0073522 A1 Apr. 15, 2004

(30) Foreign Application Priority Data

Jun. 19, 2000 (GB) ................................ 0015004.5

(51) Int. Cl.
*G06F 17/00* (2006.01)

(52) U.S. Cl. ...................................... 705/401; 705/404

(58) Field of Classification Search ......... 705/400–410
See application file for complete search history.

(56) References Cited

U.S. PATENT DOCUMENTS 4,853,864 A * 8/1989 Hart et al. .................. 705/403
4,868,757 A * 9/1989 Gil ............................ 705/406
4,888,803 A * 12/1989 Pastor ......................... 380/51

(Continued)

FOREIGN PATENT DOCUMENTS

EP 0741374 11/1996

(Continued)

OTHER PUBLICATIONS

"Pub. 401-A—Manifest Mailing System", http://www.usps.com/cpim/ftp/pubs/pub401a_print.htm.*

*Primary Examiner*—John W. Hayes
*Assistant Examiner*—Rutao Wu
(74) *Attorney, Agent, or Firm*—Alfred A. Fressola; Ware, Fressola, Van Der Sluys & Adolphson LLP

(57) ABSTRACT

A system for preparing mail for submission to a postal service is described, the system comprising: a mail finishing system of the mailer for generating items of mail for inclusion in a submission of mail by the mailer to the postal service; an announcement system of the mailer for analyzing the items of mail generated by the mail finishing system and generating an electronic statement based on the composition and value of the items of mail in the submission and transmitting the electronic statement to the postal service via an electronic link therewith; and a secure accounting system of the mailer connected to the mail finishing system and to the announcement system for generating accounting data relating to the items of mail in the submission. In a preferred embodiment, the electronic link between the announcement system of the mailer and the postal service may be established via the internet. A corresponding method of exchanging information between a mailer and a postal service is also described.

15 Claims, 11 Drawing Sheets

U.S. PATENT DOCUMENTS

| | | | | | |
|---|---|---|---|---|---|
| 4,907,161 | A | * | 3/1990 | Sansone et al. | 705/403 |
| 5,001,648 | A | * | 3/1991 | Baker | 705/407 |
| 5,454,038 | A | * | 9/1995 | Cordery et al. | 705/60 |
| 5,586,036 | A | * | 12/1996 | Pintsov | 705/408 |
| 5,655,023 | A | * | 8/1997 | Cordery et al. | 380/51 |
| 5,675,650 | A | * | 10/1997 | Cordery et al. | 705/60 |
| 5,712,787 | A | | 1/1998 | Yeung | |
| 5,826,247 | A | * | 10/1998 | Pintsov et al. | 705/404 |
| 5,935,221 | A | * | 8/1999 | Felmus et al. | 710/10 |
| 6,009,416 | A | * | 12/1999 | Pintsov | 705/410 |
| 6,175,825 | B1 | * | 1/2001 | Fruechtel | 705/404 |

FOREIGN PATENT DOCUMENTS

| | | |
|---|---|---|
| WO | 9857302 | 12/1998 |

* cited by examiner

| Data Element | Size | Category | Description |
|---|---|---|---|
| Postal Security Device (PSD) Id | 8 Chars | Mandatory | Unique identifier for the device performing the accounting |
| Item Number | 8 Chars | Mandatory | Number that in conjunction with the PSD id uniquely identifies the mail piece |
| Value | 5 Chars | Mandatory | Value that is accounted for in the PSD |
| Currency | Symbol | Conditional | Currency related to accounted value |
| Service | 3 Chars | Conditional | Service indicator defined by the postal service to determine the handling requirements, postage class, etc related to the mail piece |
| Batch Number | 6 Chars | Optional | Reference number allocated to a batch of mail by the mailer |
| Customer Data Field | | Optional | Customer defined information to be included in the indicia |
| MAC | 1 Char | | Cryptographic validation code related to indicia |

FIG. 2

Statement of Induction Physical

This will define the set of physical mail to be collected by / delivered to the post

| Data Element | Description |
|---|---|
| Customer details | Name, Address and account details of the Customer |
| Acceptance location | Location where the mail is to be delivered to or collected from |
| Date | Date the induction is to occur |
| SoM information | Batch id / Total No. Items / Total Weight / Total Pallets / Total Trays as a summary for each mailing submission |
| Induction information | Total Pallets / Total Trays as a summary of the total covered by the Statement of Induction |
| Signature | To be signed at point of collection or deposition, to confirm transfer of responsibility (thus giving a physical equivalent of the Statement of Induction Acceptance). |

FIG. 10

Tray Label / Pallet label

| Data Element | Description |
|---|---|
| Customer Number mail finisher | The customer number of the mail finisher to be human and machine readable |
| Destination Code | First two digits of destination code to be human and machine readable |
| Handling Code | How pallet or tray is to be handled |
| Incremental Number | Number relevant to post |
| Batch Number | Logical relationship to mailers batch |

FIG. 11

MAILER-POSTAL SERVICE INTERFACES

CROSS REFERENCE TO RELATED APPLICATIONS

This application is for entry into the U.S. national phase under §371 for International Application No. PCT/EP01/06659 having an international filing date of Jun. 12, 2001, and from which priority is claimed under all applicable sections of Title 35 of the United States Code including, but not limited to, Sections 120, 363 and 365(c), and which in turn claims priority under 35 USC §119 to Great Britain Patent Application No. 0015004.5 filed on Jun. 19, 2000.

TECHNICAL FIELD

The present invention relates to the interface between a mailer who generates mail and a postal service which distributes and delivers the mail generated by the mailer in return for appropriate payment provided by the mailer.

BACKGROUND OF THE INVENTION

Conventionally, provision of information pertaining to items of mail by the mailer to the postal service has been conducted by means of printing or writing this information in a paper-based format. For example, a statement of mailing listing the contents of a submission of mail inducted into the postal system has conventionally been provided by the mailer to the postal service in a paper-based format. Statements of induction defining the set of submissions inducted into the postal system as part of a single hand-over transaction have similarly conventionally been provided in a paper-based format. Likewise, the postage indicium printed on an item of mail conventionally provides information on payment by the mailer for the postal services provided in return in a format which is restricted by the use of the item of mail itself as the medium for providing this information.

On the other hand, over the last couple of decades, there has been considerable progress in interchange of accounting information by electronic means between a secure accounting system of the mailer and the reconciliation and support systems associated with the postal service. For example, postage metering systems are now widespread in which payment for postal services is conducted by logging postage value used in one or more accounting registers of the accounting system at the mailer's location, these accounting registers being reconcilable by the postal services by establishment of an electronic connection with the reconciliation systems of the postal service, for example by connection over a public-switched network. Various of such systems for transferring accounting information by electronic means between the mailer and the postal service are known as remote meter re-setting systems.

Interchange of information between the mailer and the postal services in a paper-based format has disadvantages associated with accidental introduction of errors into the information at various stages along its path between the mailer and the postal service, the possibility of fraud (which may be considered a deliberate, rather than an accidental error) and inefficiencies resulting from transferring information from a paper-based format into electronic form upon entry into a computer database, which is both costly and time consuming. Minimising the percentage of information interchanged between the mailer and the postal service in a paper-based format is therefore highly desirable. On the other hand, the conventional situation in which some information is currently exchanged between mailer and postal service in a paper-based format and some information is currently exchanged in an electronic-based format makes it difficult to convert the parts of the mailer—postal service interface which are paper-based into an electronic-based format without having a knock-on effect upon the parts of the mailer—postal service interface which are already electronic-based.

SUMMARY OF THE INVENTION

Accordingly, an object of the present invention is to provide an improved mailer-postal service interface in which the volume of paper-based information exchanged is minimised, whilst the integration of electronic-based information interchange with necessarily paper-based information interchange between the mailer and the postal service is harmoniously integrated as successfully as possible, whilst also providing security advantages in protection against errors and fraud in comparison to conventional systems.

In one aspect, therefore, the present invention provides a system for preparing mail for submission to a postal service, the system comprising a mail finishing system of the mailer for generating items of mail for inclusion in a submission of mail by the mailer to the postal service; an announcement system of the mailer for analyzing the items of mail generated by the mail finishing system and generating an electronic statement based on the composition and value of the items of mail in the submission and transmitting the electronic statement to the postal service via an electronic link therewith; and a secure accounting system of the mailer connected to the mail finishing system and to the announcement system for generating accounting data relating to the items of mail in the submission.

In a preferred embodiment, the system further comprises an acceptance system of the postal service for receiving the electronic statement generated by the announcement system via the electronic link; and an accounting reconciliation system of the postal service for receiving the electronic statement and the accounting data generated by the secure accounting system and transmitted by the announcement system via the electronic link for reconciliation with invoices from the postal service.

Preferably the electronic link between the mailer and the postal service is made via the internet Messages exchanged via the electronic link may be formatted in the Electronic Data Interchange (EDI) standard developed by the Data Interchange Standards Association (DISA). The EDI format uses field codes to specify the data being exchanged. By ensuring that all EDI-based communications have the same data in the same place in an electronic message, this protocol enables easy mutual recognition of electronic messages.

In a second aspect, the present invention provides a method of exchanging information between a mailer and a postal service, the method comprising: establishing an electronic link between an announcement system of the mailer and an acceptance system of the postal service and between the announcement system and an accounting reconciliation system of the postal service, analyzing by means of the announcement system items of mail generated by a mail finishing system of the mailer for inclusion in a submission of mail by the mailer to the postal service, generating an electronic statement based on the composition and value of the items of mail in the submission, transmitting the statement from the announcement system via the electronic link to the acceptance system, generating by means of a secure accounting system of the mailer connected to the mail finishing system accounting data relating to the items of mail in the submission, and transmitting the accounting data from the secure accounting system by means of the announcement system via the electronic link to the accounting reconciliation system of the postal service for reconciliation with invoices from the postal service.

The method of the invention may further comprise providing by means of a print sub-system of the mail finishing system an item of mail in the submission with a digital postage indicium, the digits of which are generated by the announcement system on the basis of information derived from the mail finishing system.

According to another aspect of the invention, there is provided a system for processing a mail submission received from a mail preparing system, comprising an acceptance system for receiving via an electronic link an electronic statement based on the composition and value of items of mail in a submission; and an accounting reconciliation system for receiving the electronic statement and accounting data generated by a secure accounting system of a mailer for reconciliation with invoices.

The features and advantages of the present invention will be better understood from the following description, given by way of example, in association with the accompanying drawings, in which:

BRIEF DESCRIPTION OF THE DRAWINGS

FIG. 2 represents data elements of a postage indicium according to an embodiment of the invention;

FIG. 10 represents data elements of a physical statement of induction, being part of information provided in a paper-based format by the mailer to the postal service;

FIG. 11 represents data elements of a tray or pallet label, being another part of information provided in a paper-based format by the mailer to the postal service.

DETAILED DESCRIPTION

Figure 1:
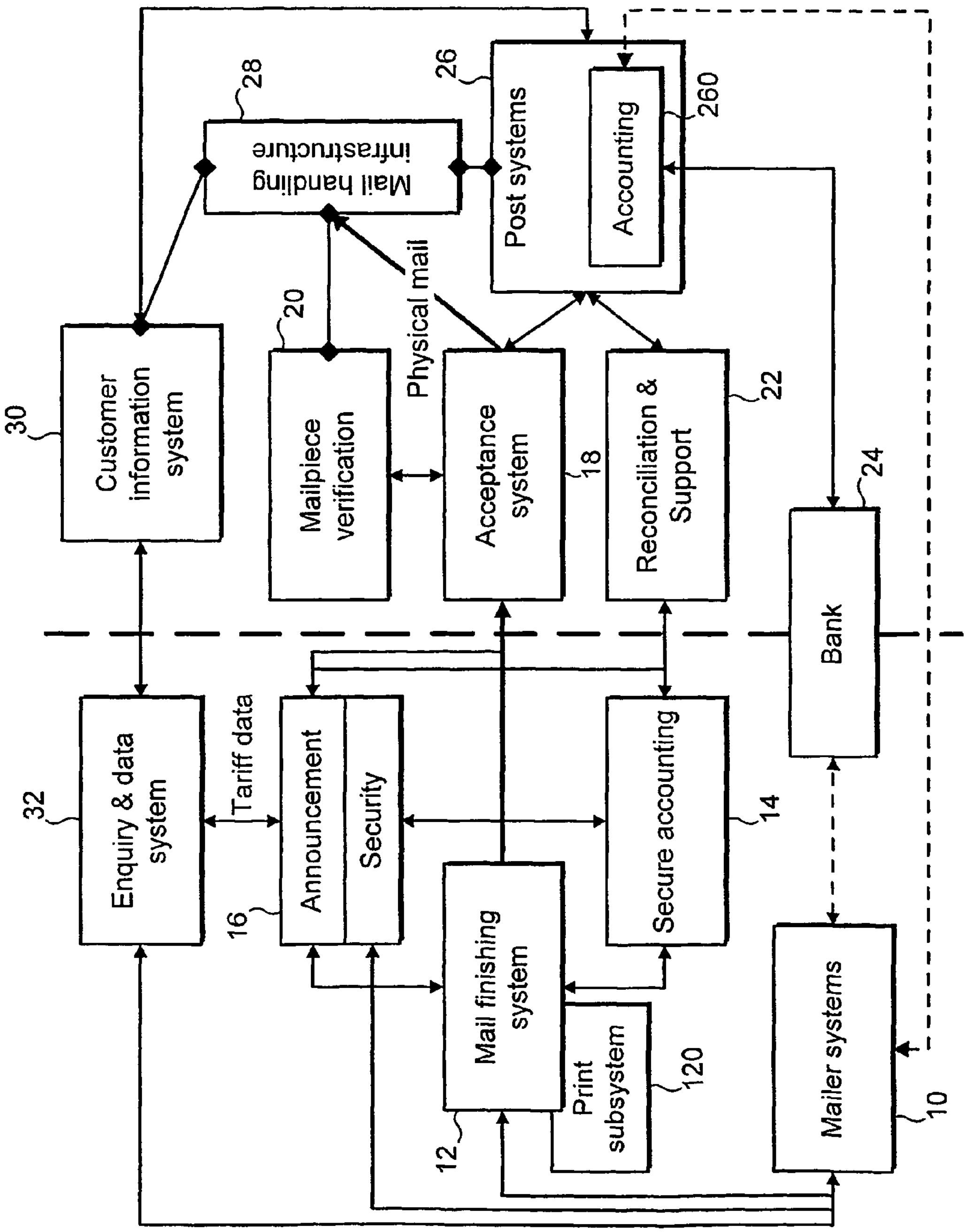
FIG. 1 schematically shows the component parts of a mailer—postal service interface.

In the drawings and in the following description, the mailer may also be referred to alternatively as a customer of the postal service.

A mailer—postal service interface may be represented schematically as shown in FIG. 1, in which the enumerated boxes represent functional components of the interface and the vertical dashed line down the centre of FIG. 1 divides functional components of the interface generally associated with the mailer (shown in the left-hand side of FIG. 1) from functional components of the interface generally associated with the postal service (shown in the right-hand side of FIG. 1).

The mailer-postal service interface shown in FIG. 1 is concerned with bulk volume of mail, the hand-over of which from the mailer to the postal service is announced by means of a statement of mailing submission (SMS). A statement of mailing submission is a message or document, from the mailer to the postal service describing the composition of a submission. The process of hand-over, of one or more submissions of mail, for acceptance by the postal service is called induction. Where several submissions are handed over as part of a single transaction, the set of submissions concerned is documented in a statement of induction (Sol). A statement of induction is a message which defines the set of submissions inducted into the postal system as part of a single hand-over transaction. A submission is part of a mailing which is inducted (possibly with submissions from other mailings) as a single unit. A mailing is a logical collection of mail, from the perspective of the mailer. Normally, a mailing will comprise mail which it is logical to generate as a unit as will be the unit for which the mailer expects to be invoiced. For physical production purposes, mailings may be broken down into one or more production batches. For induction purposes, on the other hand, they are broken down into submissions, with individual submissions being separately inducted. This may occur, for example, when the production of a mailing is spread over several days. Some postal services, however, may require each submission to be treated as a separate mailing, or may limit the number of submissions into which a mailing is split.

The functional components enumerated in FIG. 1 will now be described.

A mailer systems component 10 represents existing customer data processing systems, dealing with normal business functions including mail generation and company accounting. For example, such data processing systems include desktop computers running application programs for word processing and maintaining records and accounts.

A mail finishing system component 12 represents specialised equipment and control systems used for converting raw documents derived from the mailer systems 10 into finished mail, ready for hand-over to the postal service. Such equipment includes inserting, enveloping and addressing or labelling machines, postage metering equipment, bundling and wrapping equipment, etc.

The mail finishing system 12 comprises a mail finishing print sub-system 120 which is responsible for the composition and printing of proof-of-payment indicia on mail items. It assembles data components required for a digital proof-of-payment mark to be added to mail items, encodes these in appropriate symbology and controls the process for the printing thereof on mail items.

A secure accounting system 14 is a trusted accounting device responsible for maintaining secure information and returning, to its controlling IT system, a digital signature for use in the authentication of postal payment indicia. At the end of each mail production run by the mailer, it also provides data and a cryptographic signature for a statement of mailing.

During a mail run, the mail finishing system 12 passes postal rating information (e.g. the mail type and weight) to the secure accounting system 14. The secure accounting system supports payment security (encryption and authentication) requirements, maintains accounting information related to payments effected by the mailer, pre-paid or credit balance outstanding and unused payment tokens, returns a postage amount based on the requested input parameters, together with a digital signature or other payment evidencing token, and maintains a summary of mail piece types so that a statement of mailing can be generated at the completion of the mail run.

To fulfil these functions, the secure accounting system 14 uses cryptographic techniques, based on design-specific algorithms and key management systems. It communicates with other devices and systems primarily through an announcement system 16 (described below), but may communicate directly with reconciliation and support systems 22 used for maintenance and re-crediting of postal finds. Following the passing of the postal rating information from the mail finishing system 12 to the secure accounting system 14, therefore, the secure accounting system 14 relays this information to announcement system 16.

The secure accounting system 14 is responsible for controlling and interfacing with other components to ensure that the mail produced by the mailer is properly accounted for and provided with appropriate proof of payment marks in the form of digital indicia. Its main purpose is to complement the mailer and/or mail finishing systems 10, 12, as well as being for accounting for and printing the digital indicium onto each mail-piece. The announcement system 16, on the other hand, is responsible for compilation of data for statements of mailing, and the electronic submission of these to the postal service's acceptance system 18 and the processing of responses received from that system.

An acceptance system 18 supports the acceptance of mail into the postal service's mail handling environment and controls the hand-over of mail from the mailer to the postal service. This hand-over may take place either on the mailer's premises or in postal acceptance offices.

The acceptance system 18 accepts, records and acknowledges the arrival from mailers of electronic statements of induction of mail. Data provided in the statements of induction (described in detail below) are passed to the postal service's collections and other planning systems to support logistics optimisation, and to the mail-piece verification system 20 for revenue protection purposes.

The acceptance system 18 provides mail acceptance staff with an automated capability to authenticate incoming mail based on submitted statements of induction (SOI). Where a mail submission can be reconciled with the SOI which describes it, the SOI is passed to the postal service's accounting system 260 for accounting verification, revenue reconciliation and, in the case of post-invoicing, invoicing purposes. Receipt and acceptance of the mail submission is acknowledged to the customer's announcement system 16.

If no reconciliation is possible, the acceptance system 18 informs the operator. When there is a justifiable suspicion that fraud has been attempted by the mailer, the acceptance system will assist in obtaining evidence of this.

The acceptance system 18 may also be used in the acceptance of mail submissions for which no statement of mailing has been submitted. In this case, data for validation is gained from sampling individual mail pieces.

A mail-piece verification system 20 processes and authenticates the payment evidence and/or customer identification provided by the indicium printed on each mail piece and collects information needed for accounting or accounting verification. In particular, it accepts data from individual mail pieces collected by the mail handling infrastructure, checks that such data presents acceptable evidence of payment for the services required, compares the data for consistency with information from the statement of induction, where that exists, acknowledges to the acceptance system 18 the validity of the statements of mailing involved, and passes data on payment evidence for payment management and fraud detection purposes to the acceptance system 18.

Reconciliation and support systems 22 is a collective name for a number of systems concerned with the management of postage accounting devices installed on the mailer's premises. Such systems provide re-setting services, i.e. services for the re-setting or re-crediting of postage payment devices, for example to the secure accounting system 4, and monitoring and maintenance services, i.e. services concerned with ensuring the functionality and reliability of postage payment devices and with detecting and preventing attempts to tamper with them. Again, these services concern primarily the secure accounting system 14.

The reconciliation and support systems 22 may be owned and/or operated either by a postal administration, or by a third party, working on behalf of the postal administration concerned.

A bank component 24 represents the means of effecting payment, normally through the commercial or postal banking system.

Post systems 26 represent the postal data processing infrastructure, including systems for customer account management and traditional accounting (bookkeeping) systems.

A mail handling infrastructure component 28 represents existing infrastructure for automated mail processing, including optical character recognition (OCR) and bar-code sorting machines, delivery sequencing equipment, etc. The process control systems used to manage this infrastructure are also included.

For present purposes, mail item data capture will come primarily from hand-held scanning devices associated directly with the verification system 20, rather than from the existing infrastructure.

A customer information system 30 is a system which supports the electronic reporting of, and access to, information on the acceptance and processing of the mailer's special category mail, the provision of postal information (both public and customer-contract specific) to assist the mailer in preparing mail for submission to the postal service, and the expression and recording of the mailer's preferences for the way mail is delivered to them.

An enquiry and data system 32 is the mailer's complement to the customer information system 30. It can be implemented using a standard worldwide web browser to access the customer information system 30.

In FIG. 1, physical mail follows the path represented by the bold arrow from mail finishing system 12 to acceptance system 18 and thence to mail handling infrastructure 28. Other arrows in FIG. 1 represents interchange of information relating to mail contents, including but not restricted to, for example, mail type and weight and accounting information and information for incorporation as part of the physical mail itself. Diamond-headed lines in FIG. 1. connecting component boxes 20, 26, 28 and 30 represent data integration conducted by the postal service.

According to one embodiment of the invention, the postage indicium which is provided in a digital format and information provided to the postal service via the electronic link are complementary, so as to provide all information necessary for the postal service to be able to process mail inducted from the mailer. FIG. 2 shows data elements contained in such a digital postage indicium. These elements create a string of characters, which may be encoded in machine-readable format by optical character recognition (OCR) technology or in a one- or two-dimensional barcode.

At least the following data elements are mandatory for inclusion in the digital postage indicium according to this embodiment of the invention: an identifier of the postal security device (PSD) performing the secure accounting function represented by box 14 in FIG. 1, a unique item number for the mail-piece bearing the postage indicium in question, and the value of the postage for that mail-piece accounted for by the PSD. The currency of the postage value and the service required for the mail item in question may also be made mandatory conditional upon the situation. The customer may further include various optional data elements in the postage indicium, such as a batch number and customer data field.

Furthermore, to protect the digital postage indicium from fraud, a message authentication code (MAC) may also be provided by an additional character in the postage indicium. In the context of the digital postage indicium, the MAC is provided by a cryptographic validation code related to the other data elements of the indicium.

Adding the address of the intended recipient of the item of mail into the indicium is also beneficial for preventing and detecting fraud. For high-volume mailers, the electronic link provides a second possible way by which address information may be transmitted from the mailer to the postal service other than by writing or printing on the paper-based format of the mail item itself. Provision of address information via the electronic link in such a fashion is also beneficial for fraud prevention and detection, provided that the source of the address information from the address database of the customer is not accessible to a third party.

Figure 3:
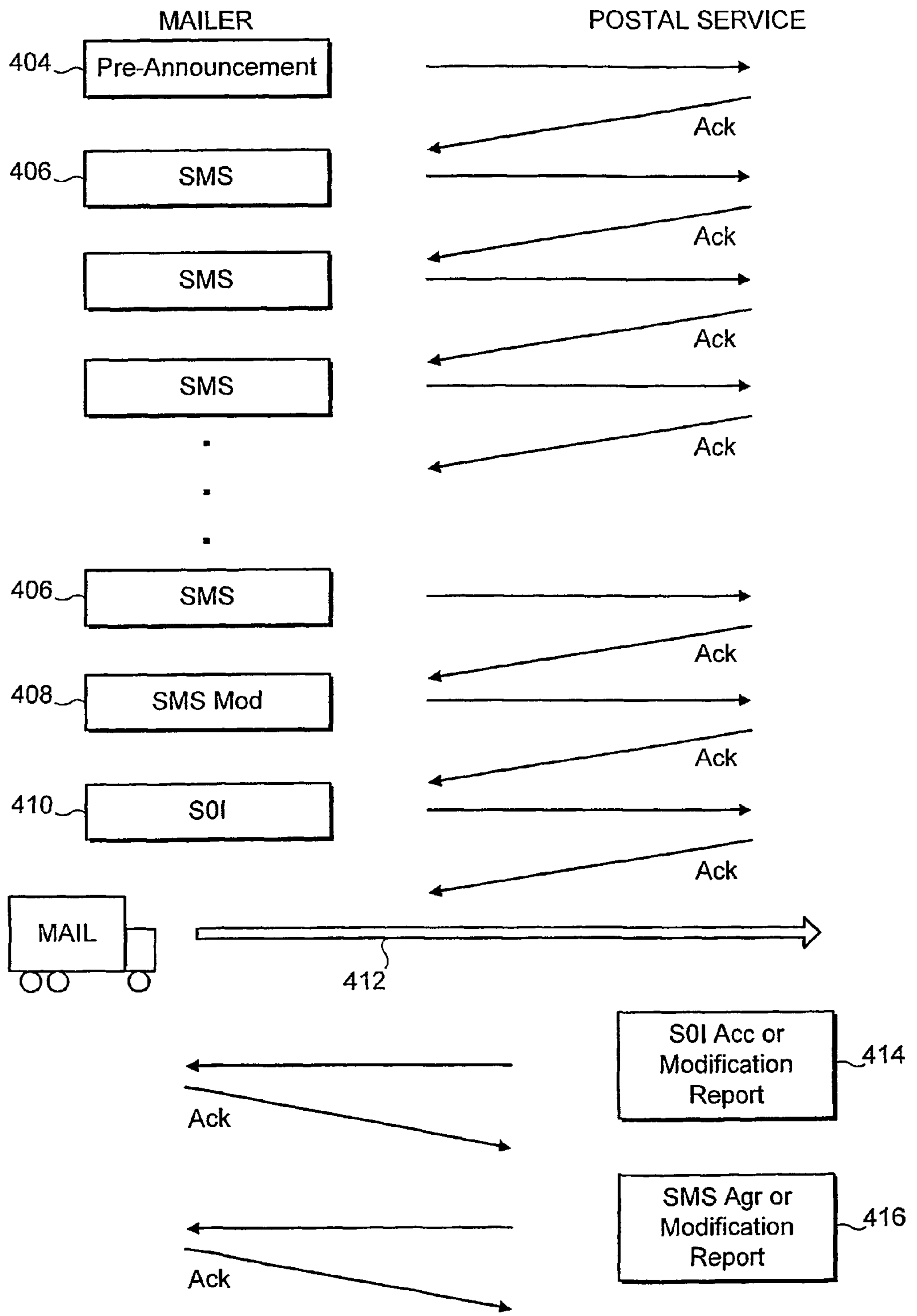
FIG. 3 represents an interchange of information between the announcement system of the mailer and the acceptance system of the postal service via the electronic link in accordance with the embodiment of the invention.

According to this embodiment, transfer of information via the electronic link is conducted using a protocol intended to provide security, confidentiality and authenticity, the steps of which are shown in FIG. 3. and described in greater detail in relation to FIGS. 4 to 9. However, digital signatures may additionally be used to confirm the security of the data involved in messages transferred via the electronic link.

Figure 4:
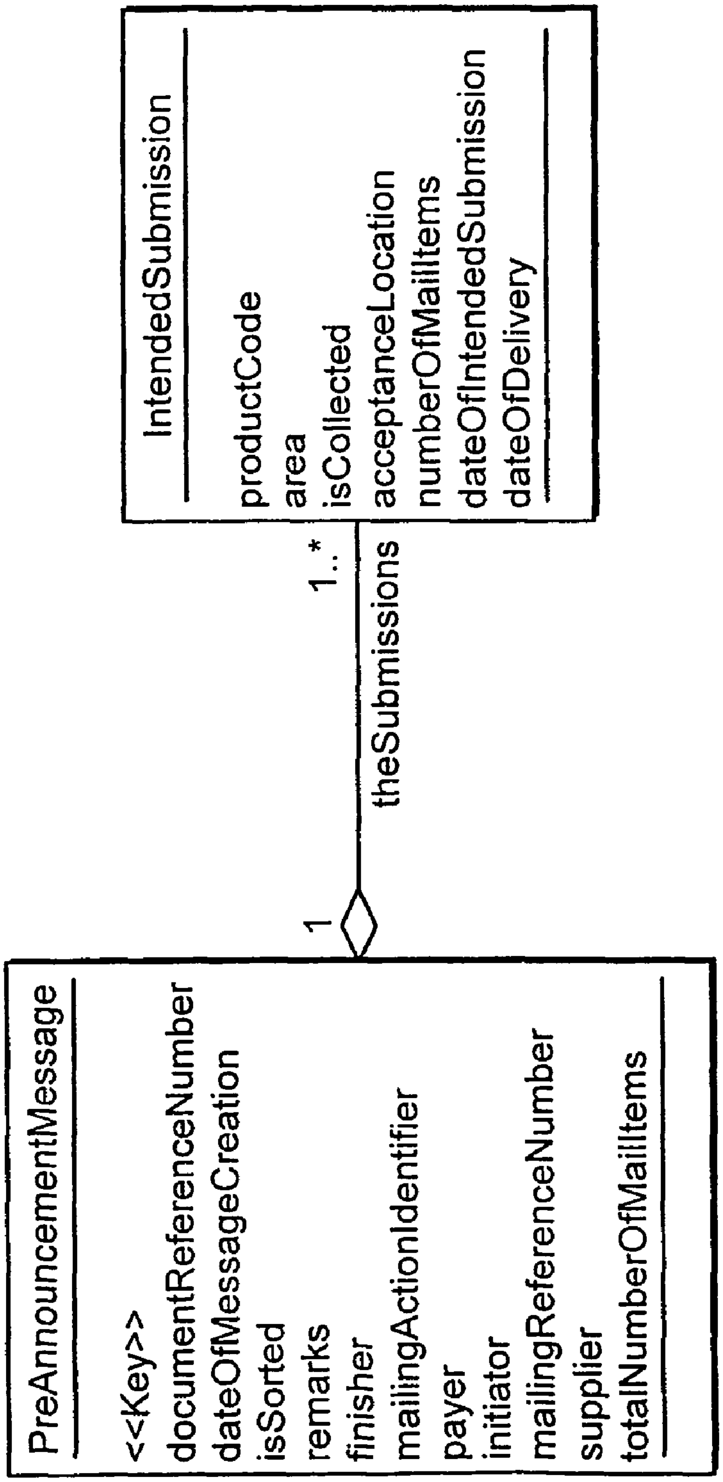
FIG. 4 represents data elements of a pre-announcement transmitted via the electronic link.
Figure 9:
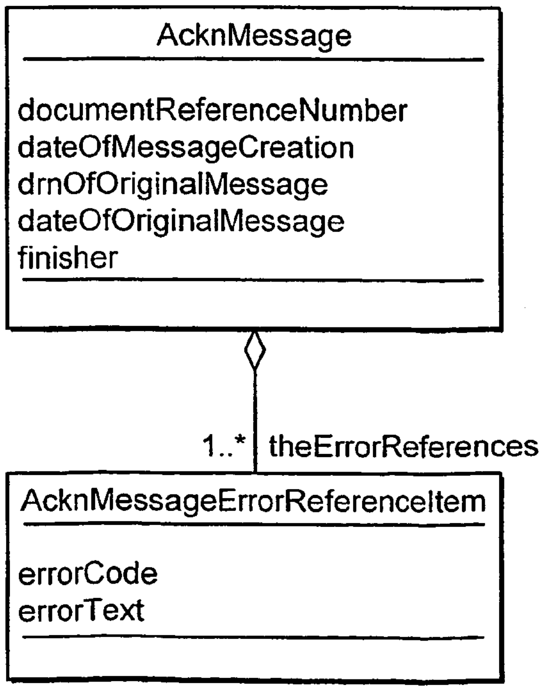
FIG. 9 represents data elements of an acknowledgement message transmitted via the electronic link.

Initially, when the mailer creates plans for mail batch production, the details of these plans are entered into the announcement system 14. The announcement system then monitors production of the mail in conjunction with the operation of the mail finishing machines 12 in order to provide a report on the status of the production process. This monitored information is passed on to the postal service via the electronic link in a pre-announcement message, the data elements of which are shown in FIG. 4. Like all of the electronic messages transferred via the electronic link according to this embodiment, the pre-announcement message is composed of a header, a body and a footer. Firstly, the pre-announcement message, represented by box 404 in FIG. 3 is transferred via the electronic link from the mailer to the postal service in order to alert the postal service that one or more batches of mail is to be submitted by the mailer to the postal service. Acknowledgement of receipt of the pre-announcement message is then made in return by the postal service to the mailer, again via the electronic link. The format of such an acknowledgement message is shown in FIG. 9. This format may be used for all acknowledgement messages transmitted from the postal service to the mailer and vice versa via the electronic link. Transmission of the pre-announcement message (and its acknowledgement) are optional. Instead, the mailer may proceed directly to the next step in transferring information via the electronic link, without transmitting a pre-announcement message 404.

Figure 5:
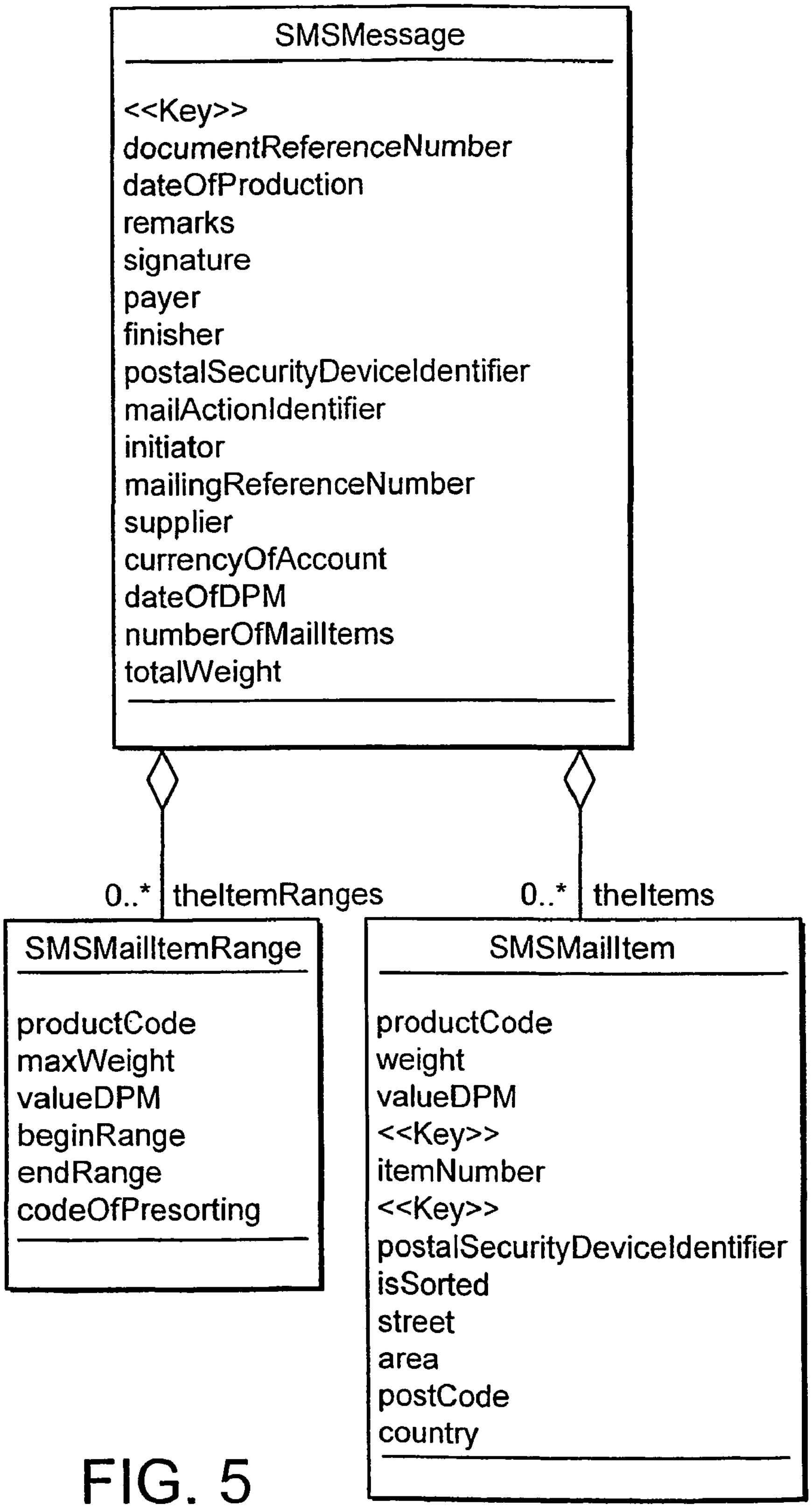
FIG. 5 represents data elements of a statement of mailing submission (SMS) transmitted via the electronic link.

Next, the announcement system 14 prepares a statement of mailing submission (SMS), represented by box 406 in FIG. 3, for each batch of mail that is to be submitted. Each SMS provides a summary or breakdown of the contents of a corresponding submission of a batch of mail to be inducted by the postal service, as shown in FIG. 5. Accounting information can further be provided in each SMS which can then be used by the reconciliation and support systems 22 in association with accounting information provided via the electronic link by the secure accounting unit 14 to reconcile invoicing for acceptance of each mail submission in question.

Upon receipt of each SMS 406, the postal service transmits a corresponding acknowledgement signal back to the mailer via the electronic link, as shown in FIG. 3.

As represented by box 408 in FIG. 3, the mailer may optionally transmit a modification record via the electronic link to the postal service. Such a modification record will be required if the shipment details contained in one or more of the original statements of mailing submission 406 are not correct. Upon receipt of the modification record 408, the postal service provides an acknowledgement signal in return to the mailer via the electronic link. Further provision of modification records 408 by the mailer to the postal service via the electronic link may be conducted as many times as are required until the statements of mailing submission 406 correspond as closely as the mailer can achieve to the actual items of mail to be inducted into the postal service.

Figure 6:
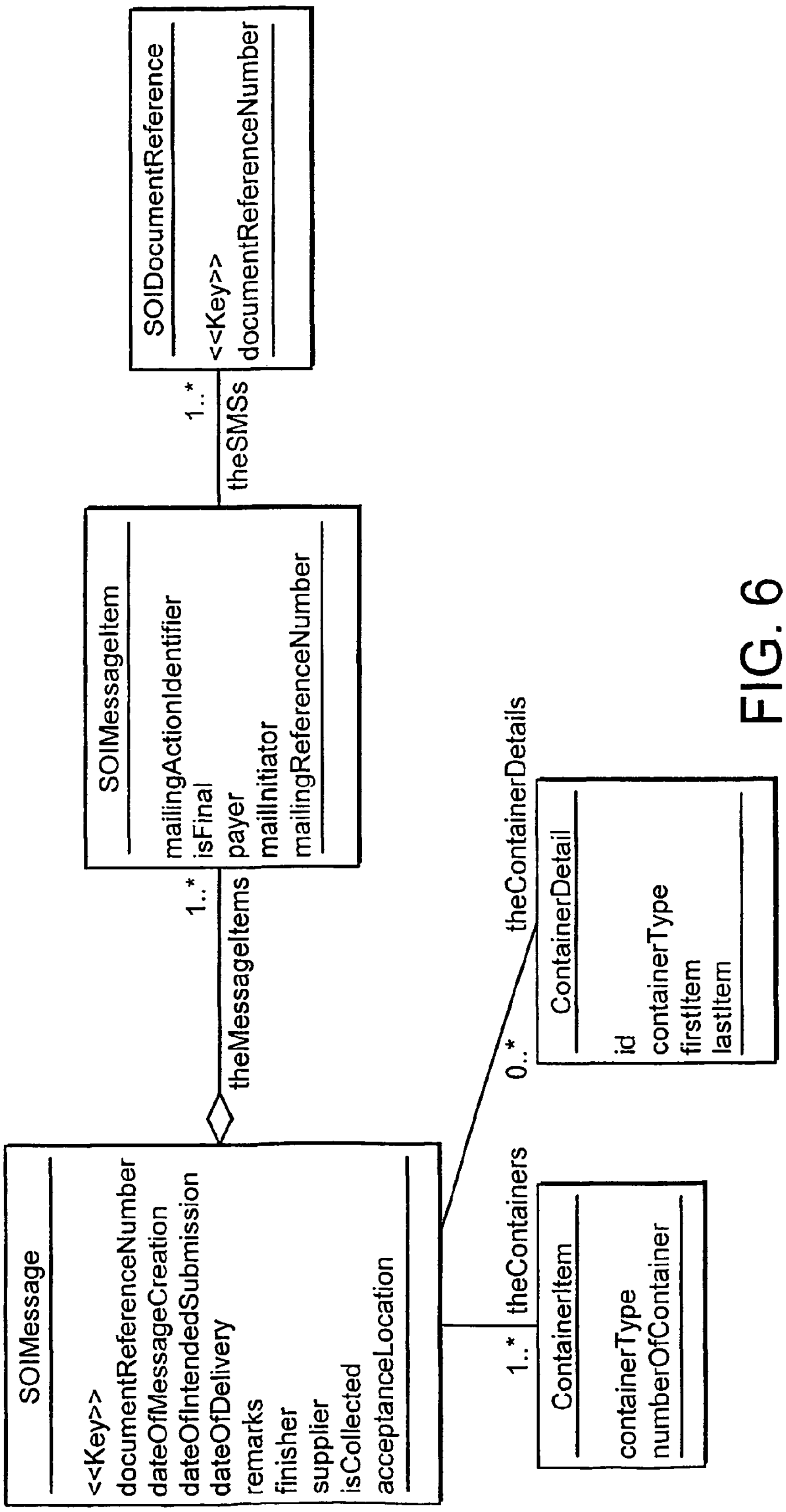
FIG. 6 represents data elements of a statement of induction (SOI) transmitted via the electronic link.
Figure 7:
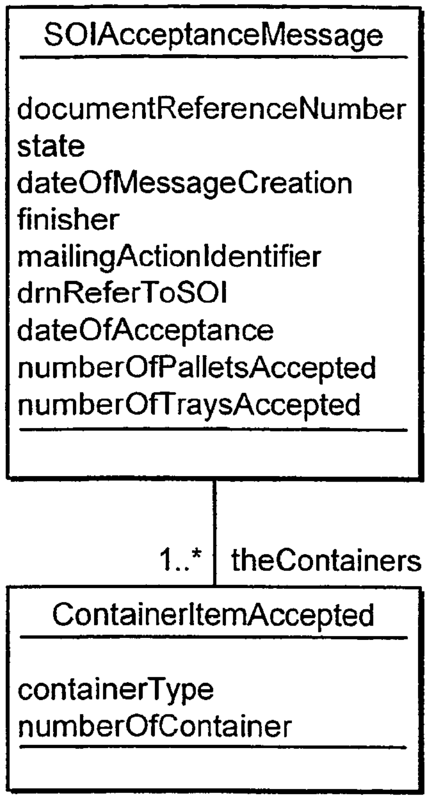
FIG. 7 represents data elements of a statement of induction acceptance transmitted via the electronic link.

Next, the mailer submits a statement of induction (SOI), represented by box 410 in FIG. 3. As shown in FIG. 6, apart from the header and the footer of the statement of induction 410, the body of the statement of induction message is composed of information identifying one or more statements of mailing submission 406 that have previously been transmitted. The statement of induction 410 thereby identifies which submissions of mail are to be delivered to the postal service in a single delivery of mail. Following receipt of the SOI 410, further modification records 408 can no longer be transmitted by the mailer. Receipt of the statement of induction message is also acknowledged in return by the postal service via the electronic link.

Physical induction of the mail in questions then follows, as represented by arrow 412 in FIG. 3.

Figure 8:
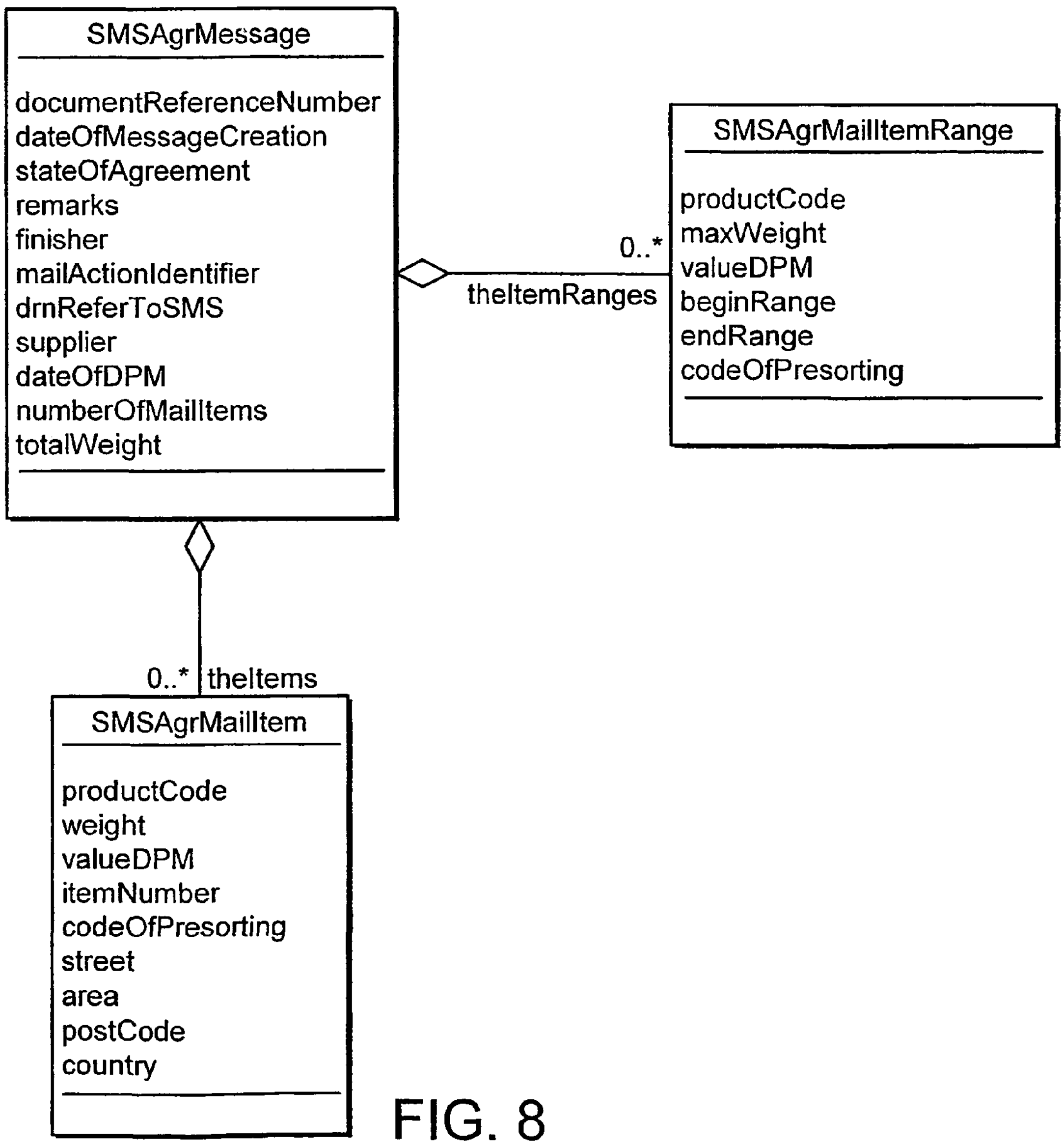
FIG. 8 represents data elements of a statement of mailing submission agreement transmitted via the electronic link.

Once the postal service is in possession of both a statement of induction 410, and the physical mail to which it relates, it can proceed with verification of the correctness of the statement of induction by its comparison with the physical mail. The postal service responds by providing a statement of induction acceptance message 414 via the electronic link to the mailer or a modification report (again via the electronic link) if the physical mail that has been submitted is found not to correspond with the information contained in the statement of induction 410, the SMSs 406 and the possible modification records 408 the SOI 410 identifies. On the other hand, the postal service may not wish to alert the mailer by means of a modification record if the postal service finds a discrepancy between the physical mail and the SOI 410, if it suspects the mailer of fraud. In such a case, an SOI Acc 414 will be sent without a modification report. The statement of induction acceptance message 414 according to this embodiment takes the format shown in FIG. 7. Upon receipt of the statement of induction acceptance 414 or a modification report, the mailer provides an acknowledge signal to the postal service via the electronic link, the format of which is again as shown in FIG. 9. Upon receipt of this acknowledgement signal, the postal service generates a statement of mailing submission agreement message (SMS Agr Message) 416, the format of which is shown in FIG. 8. This message is then transmitted to the mailer via the electronic link, and acknowledged in return (as shown in FIG. 3) with another acknowledgement message of the type shown in FIG. 9.

The statement of induction acceptance message 414, transmitted by the postal service to the mailer, confirms that responsibility for the mail described in the statement of induction 410 has been accepted by the postal service. The statement of induction acceptance message 414 can give details of any discrepancies found in the physical mail which is received by the postal service from the mailer by means of a modification report as described above, but does not indicate agreement by the postal service with the detailed descriptions contained in the one or more statements of mailing submission 406 identified by the statement of induction 410. Instead, the statement of induction acceptance 414 indicates that the postal service takes responsibility for the physical mail to which it relates.

On the other hand, the statement of mailing submission agreement message 416 is returned by the postal service to the mailer to confirm that the physical mail has been verified and agreed by the postal service. Modification data can be provided in the statement of mailing agreement 416 as a further modification record if the physical mail submission received by the postal service does not agree with the statement of induction 410 and SMSs 406 identified thereby. Once again, if the postal service is aware of a discrepancy between the physical mail and the SOI 410 but suspects the mailer of fraud, the modification report may be withheld to avoid alerting the mailer to the postal service's suspicions. Finally, the mailer acknowledges receipt of the SMS agreement message 416 by means of another acknowledgement message of the type shown in FIG. 9.

At the time of induction of the physical mail to which the statement of induction 410 relates, a corresponding physical statement of induction is also provided with the items of mail in question. This physical statement of induction defines the set of physical mail to be collected by or delivered to the postal service and according to this embodiment takes the format shown in FIG. 10. Although all the information contained in the physical statement of induction of FIG. 10 is already made available to the postal service by the transfer protocol conducted over the electronic link according to the description given above and shown in FIG. 3, the physical statement of induction ensures that the physical items of mail in question can be correctly matched with the electronic data provided to the postal service by means of the messages transmitted via the electronic link. On the other hand, since the electronic SOI 410 and the SMSs 406 it identifies (together with any possible modification record 408) provide the detailed information on which the postal service relies for verification of the physical mail and subsequent reconciliation of accounting data, detailed information contained in the physical statement of induction shown in FIG. 10 is optional and can be dispensed with. Additionally, since the electronic SOI 410 and the SMSs 406 it identifies are submitted via a different and more secure route than the physical mail, co-ordination of fraud by salting the physical mail and conducting corresponding adjustments to the SOI 410 becomes very much more difficult than in a conventional paper-based system, in which the physical mail may be salted and its corresponding paper-based statement of induction altered at the same time by the mailer.

Additionally, each tray or pallet containing items of mail forming part of a submission are labelled according to the format shown in FIG. 11. The data elements of this label similarly facilitate processing of the inducted mail by the postal service.

Figure 12:
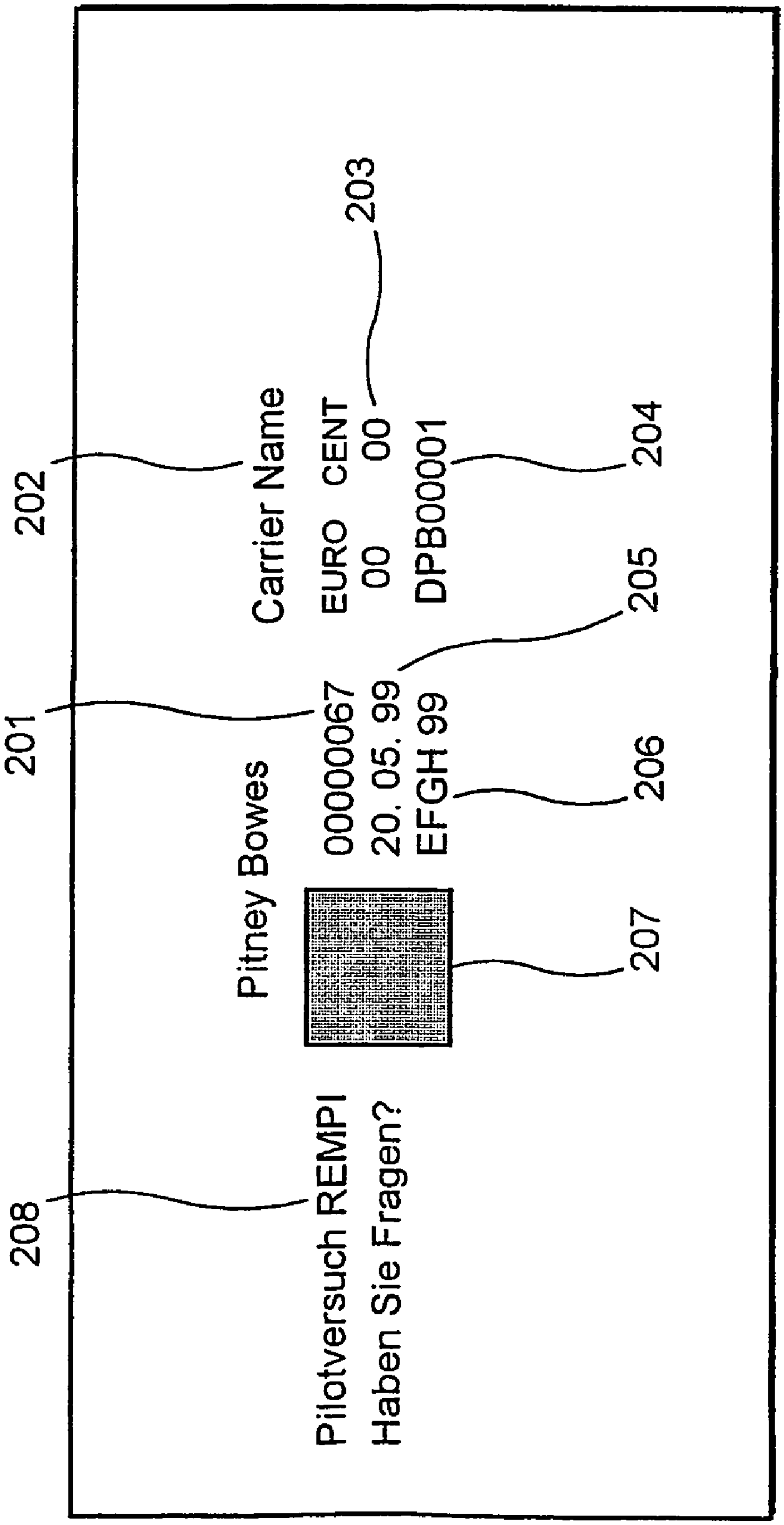
FIG. 12 is an example of an item of mail bearing a postage indicium containing data elements represented in FIG. 2.

The postage indicium printed on each mailpiece in this embodiment is shown in FIG. 12. It comprises an item number 201, a carrier indication 202, the postage amount 203, a postage security device ID 204, the date 205, a service code 206, and a 2-D encrypted bar code 207, which includes the date of production, the PSD ID, the item number and possibly other data presented as items 201-206 in an encoded form. The postage indicium may comprise additional information 208, such as advertising. The service code 206 denotes the postage class, weight range, and any special handling requirements (e.g. registered mail) of the item of mail in question.

On the other hand, since the electronic statement of induction message 410 and the SMSs 406 (together with possible modification records 408) it identifies certain full details of all items of mail inducted in step 412, the postage indicium and all the information it contains are optional. In other embodiments, therefore, the physical items of mail need only bear an indication of their destination address. This provides a further advantage over conventional paper-based techniques.

Thus, as the above-described embodiment illustrates, a mailer—postal service interface according to the invention provides a combination of postage indicia, electronic information transfer and physical documentation to accompany a submission of mail by the mailer to the postal service, which in concert minimise reliance on information provided in a paper-based format, whilst providing an interface in which paper-based and electronic information are harmoniously integrated in an error-resistant form, with improved security against fraud.

The invention claimed is:

1. A system for preparing mail by a mailer for submission to a postal service, the system comprising:

a mail finishing system (12) of the mailer for generating items of mail for inclusion in a submission of mail by the mailer to the postal service;

an announcement system (16) of the mailer connected to the mail finishing system for analyzing the items of mail generated by the mail finishing system and generating an electronic statement based on the composition and value of the items of mail in the submission and for transmitting the electronic statement to the postal service via an electronic link therewith; and a secure accounting system (14) of the mailer connected to the mail finishing system (12) and to the announcement system (16) for generating accounting data relating to the items of mail in the submission for separate transmission via the electronic link to an accounting reconciliation system of the postal service for reconciliation with invoices from the postal service;

wherein the mail finishing system, the announcement system, and the secure accounting system are located together to form said system.

2. A system according to claim 1, further comprising:

an acceptance system (18) of the postal service for receiving the electronic statement generated by the announcement system (16) via the electronic link; and the accounting reconciliation system (22) of the postal service for receiving the electronic statement and the accounting data generated by the secure accounting system (14) and transmitted by the announcement system (16) via the electronic link for reconciliation with invoices from the postal service.

3. A system for exchanging information between a mailer and a postal service according to claim 2, wherein the electronic link between the mailer and the postal service is the internet.

4. A system for exchanging information between a mailer and a postal service according to claim 3, wherein the mail finishing system (12) further comprises a print sub-system (120) for applying a digital postage indicium to an item of mail in the submission, the digits of said postage indicium being provided by the announcement system (16) on the basis of information derived by the announcement system (16) from the mail finishing system (12).

5. A system for processing a mail submission received from a mail preparing system according to claim 1, comprising:

an acceptance system (18) for receiving via an electronic link an electronic statement based on the composition and value of items of mail in a submission; and an accounting reconciliation system (22) for receiving the electronic statement and accounting data generated by a secure accounting system of a mailer for reconciliation with invoices.

6. A system for exchanging information between a mailer and a postal service according to claim 1, wherein the electronic link between the mailer and the postal service is the internet.

7. A system for exchanging information between a mailer and a postal service according to claim 1, wherein the mail finishing system (12) further comprises a print sub-system (120) for applying a digital postage indicium to an item of mail in the submission, the digits of said postage indicium being provided by the announcement system (16) on the basis of information derived by the announcement system (16) from the mail finishing system (12).

8. A system for exchanging information between a mailer and a postal service according to claim 2, wherein the mail finishing system (12) further comprises a print sub-system (120) for applying a digital postage indicium to an item of mail in the submission, the digits of said postage indicium being provided by the announcement system (16) on the basis of information derived by the announcement system (16) from the mail finishing system (12).

9. A system according to claim 2, wherein the secure accounting system directly communicates with the accounting reconciliation system of the postal service used for maintenance and re-crediting of postal funds.

10. A system according to claim 1, wherein the secure accounting system directly communicates with the accounting reconciliation system of the postal service used for maintenance and re-crediting of postal funds.

11. A method of exchanging information between a mailer and a postal service, the method comprising:

establishing an electronic link between an announcement system (16) of the mailer and an acceptance system (18) of the postal service and between the announcement system (16) and an accounting reconciliation system (22) of the postal service;

analyzing by means of the announcement system (16) items of mail generated by a mail finishing system (12) of the mailer for inclusion in a submission of mail by the mailer to the postal service;

generating an electronic statement based on the composition and value of the items of mail in the submission;

transmitting the statement from the announcement system (16) via the electronic link to the acceptance system (18);

generating by means of a secure accounting system (14) of the mailer connected to the mail finishing system (12) and to the announcement system, accounting data relating to the items of mail in the submission; and transmitting the accounting data from the secure accounting system (14) by means of the announcement system (16) via the electronic link to the accounting reconciliation system (22) of the postal service for reconciliation with invoices from the postal services; and locating the mail finishing system, the announcement system, and the secure accounting system together.

12. A method according to claim 11, wherein the electronic link between the mailer and the postal service is the internet.

13. A method according to claim 12, further comprising providing an item of mail in the submission with a digital postage indicium, the digits of the postage indicium being generated by the announcement system (16) on the basis of information derived from the mail finishing system (12).

14. A method according to claim 11, further comprising providing an item of mail in the submission with a digital postage indicium, the digits of the postage indicium being generated by the announcement system (16) on the basis of information derived from the mail finishing system (12).

15. The method according to claim 11, wherein the transmitting of accounting data from the secure accounting system is via directly transmitting said accounting data from the secure accounting system to the accounting reconciliation system of the postal service via an electronic link.

* * * * *

UNITED STATES PATENT AND TRADEMARK OFFICE

CERTIFICATE OF CORRECTION

PATENT NO. : 7,343,358 B2 
APPLICATION NO. : 10/311740
DATED : March 11, 2008
INVENTOR(S) : Rozendaal et al.

It is certified that error appears in the above-identified patent and that said Letters Patent is hereby corrected as shown below:

At column 2, line 45, please insert --.-- after the word “internet”.

At column 3, line 27, please delete the heading “Brief Description of the Drawings” and insert same after line 21.

At column 5, line 13, please delete the word “finds” and replace with the word --funds--.

At column 12, line 25, claim 11, line 25, please delete the word “services” and replace with the word --service--.

Signed and Sealed this

Eighth Day of July, 2008

JON W. DUDAS
*Director of the United States Patent and Trademark Office*